United States Patent [19]

Nagashima et al.

[11] Patent Number: 5,014,835

[45] Date of Patent: May 14, 1991

[54] POWER WORK-MACHINE

[75] Inventors: Akira Nagashima, Kawasaki; Hiroaki Koga, Sayama, both of Japan

[73] Assignee: Kioritz Corporation, Tokyo, Japan

[21] Appl. No.: 505,279

[22] Filed: Apr. 6, 1990

[30] Foreign Application Priority Data

Apr. 14, 1989 [JP] Japan ............................... 1-43918[U]

[51] Int. Cl.[5] ....................... F16D 11/00; F16D 43/14; F16D 47/00

[52] U.S. Cl. ................................ 192/48.5; 192/67 R; 192/103 B; 192/108

[58] Field of Search ............... 192/48.5, 108, 105 CD, 192/105 BA, 103 B, 67 R; 30/500; 56/2, 16.9; 464/162

[56] References Cited

U.S. PATENT DOCUMENTS

| | | | |
|---|---|---|---|
| 2,032,066 | 2/1936 | Nieman et al. | 192/105 BA X |
| 3,469,313 | 9/1969 | Martin . | |
| 3,834,183 | 9/1974 | Muller . | |
| 3,977,078 | 8/1976 | Pittinger, Jr. . | |
| 4,106,605 | 8/1978 | Winchell | 192/105 CD |
| 4,350,123 | 9/1982 | Kossek et al. . | |
| 4,457,185 | 7/1984 | Yoshida et al. | 192/105 CD X |

FOREIGN PATENT DOCUMENTS

| | | | |
|---|---|---|---|
| 929128 | 6/1963 | United Kingdom | 192/103 B |

*Primary Examiner*—Rodney H. Bonck
*Attorney, Agent, or Firm*—Browdy and Neimark

[57] ABSTRACT

A power work-machine having a clutch drum of a centrifugal clutch provided on one end of the output shaft has a plurality of peripheral notches formed on its axially extended outer end portion and a dog clutch provided on the drive shaft of a work-machine attachment has clutch claws engaging with the individual peripheral notches.

1 Claim, 2 Drawing Sheets

POWER WORK-MACHINE

BACKGROUND OF THE INVENTION

The present invention relates to a power work-machine such as a chain saw.

In general, a power work-machine, such as a chain saw, has an arrangement whereby a driving force from an engine, such as a two-cycle internal combustion engine, is transmitted through a centrifugal clutch to, for example, a chain sprocket for driving a saw chain, so that the saw chain is driven to perform work such as the work of cutting trees. Sometimes, while a power work-machine such as a chain saw serves as a power unit, a work-machine attachment designed for another type of work, such as a hedge trimmer, drill, blower or mower, is attached to the main body of the work-machine. In this case, the work-machine is used in work other than the work it is inherently designed for. In this way, multi-purpose use of a power work-machine is possible. However, some problems are encountered with conventional power work-machines. For instance, the mechanism for transmitting power from the engine of the power unit to the driving section of the attachment tends to be complicated, or fails to achieve positive transmission of power. Therefore, there have been demands for power work-machines possessing high serviceability.

SUMMARY OF THE INVENTION

The present invention has been accomplished to meet the above-described requirements. It is an object of the present invention to provide a power work-machine that allows the main body of the machine to be used as a power unit through a simple power transmission mechanism so that power is transmitted to the driving section of a work-machine attachment.

A power work-machine according to the present invention comprises: a power unit having a main body, and an output shaft extending through a portion on a first side of the main body; a centrifugal clutch provided on one end of the output shaft, the clutch including a clutch drum having an axially extended outer end portion; a plurality of peripheral grooves formed on and circumferentially arranged on the outer end portion of the clutch drum; a work-machine attachment including a mounting portion attached to the portion on the first side of the main body; and a dog clutch provided on a drive shaft of the work-machine attachment, the dog clutch including clutch claws engaging with the peripheral grooves of the clutch drum, and centering portions circumferentially arranged on the inner periphery of the clutch drum.

According to the present invention, therefore, when the work-machine attachment is being attached to the power unit, the drive shaft of the work-machine attachment can be easily connected to the output shaft of the power unit. During operation, the driving force of the output shaft is transmitted through the dog clutch to the drive shaft of the work-machine attachment so as to drive this attachment.

DESCRIPTION OF THE PREFERRED EMBODIMENT

Figure 1:
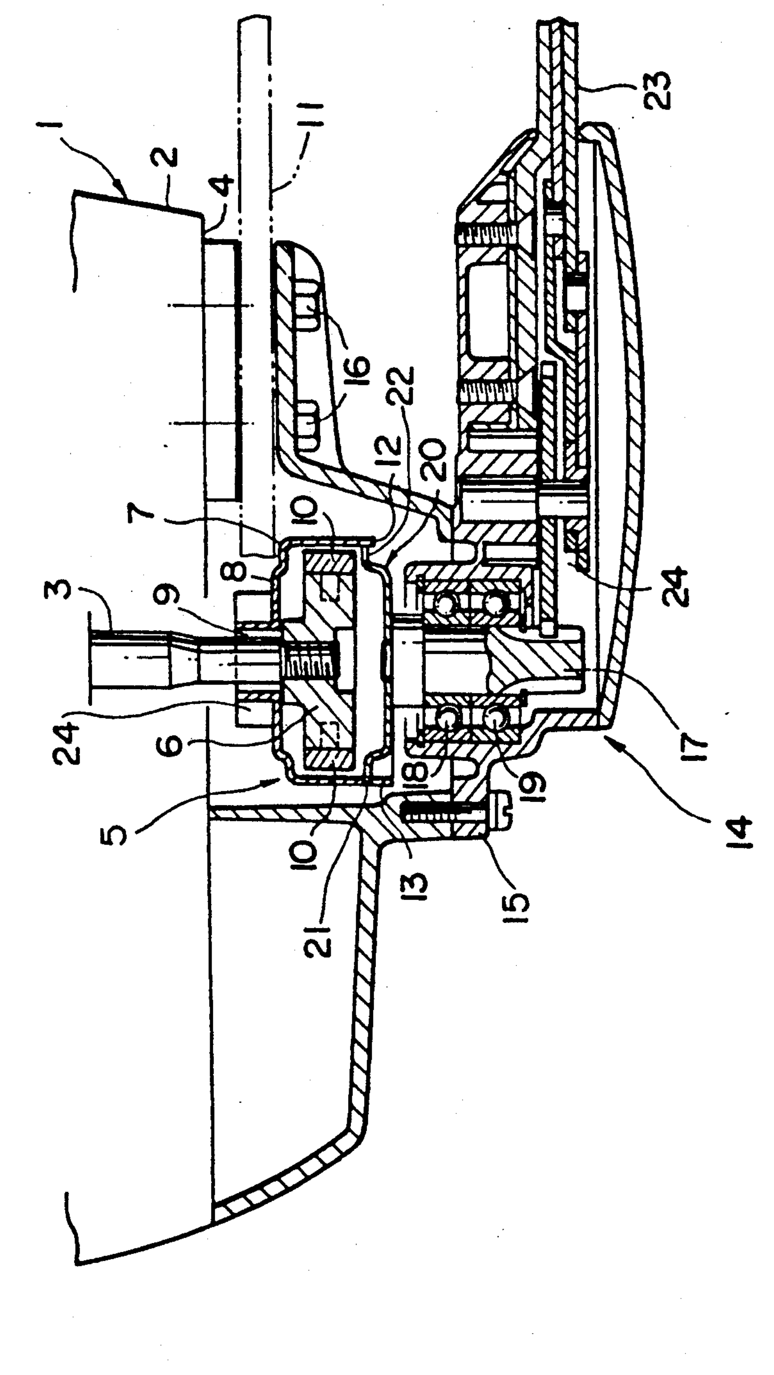
FIG. 1 is a sectional view of essential parts of a chain saw, showing one embodiment of the present invention.
Figure 2:
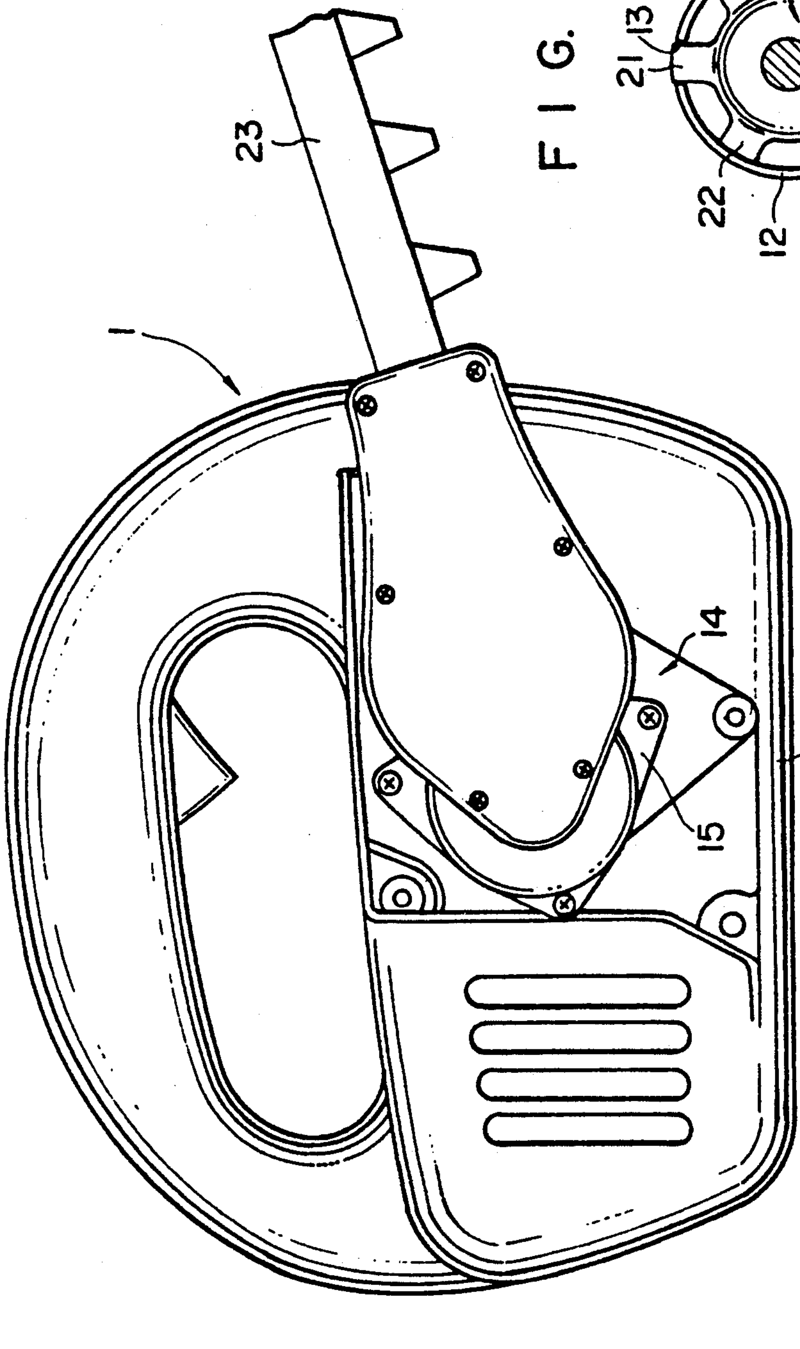
FIG. 2 is a side view of the chain saw shown in FIG. 1.
Figure 3:
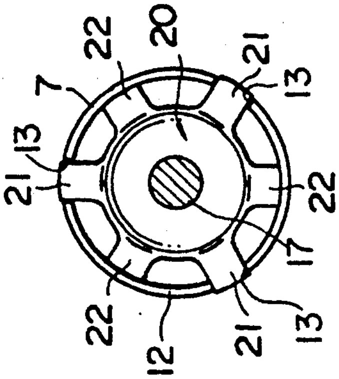
FIG. 3 is a view showing an engagement between a clutch drum of the chain saw shown in FIGS. 1 and 2, and a dog clutch.

The present invention will now be described with reference to the illustrated embodiment.

A chain saw 1, serving as a power work-machine in the illustrated embodiment, is of a common type. The chain saw 1 has a main body 2 accommodating an engine (not shown), such as a small air-cooled two-cycle internal combustion engine, and an output shaft 3 of the engine extends through a portion 4 on a first side of the main body 2. Thus, the chain saw 1 constitutes a power unit. A centrifugal clutch 5 is provided on one end of the output shaft 3. The centrifugal clutch 5 includes a clutch boss 6 on the driving side, and a clutch drum 7 on the driven side. The clutch boss 6 is secured to the output shaft 3. The clutch drum 7 is supported by a bearing 9 at an inner end portion 8 thereof in such a manner that the clutch drum 7 is disposed coaxially with the output shaft 3 and is rotatable relative to the output shaft 3 and the clutch boss 6. Clutch shoes 10, 10 are rotatably provided on the outer periphery of the clutch boss 6. When the speed of rotation of the output shaft 3 of the engine as well as the clutch boss 6 of the centrifugal clutch 5 becomes high, centrifugal force acts on the clutch shoe 10, causing the radial-outwardly displaced rotation of the shoe 10. When the clutch shoe 10 becomes tightly pressed against the inner peripheral surface of the clutch drum 7, it transmits driving force to the clutch drum 7 so that the clutch drum 7 is also rotated. A chain sprocket 24, normally engaging a saw chain (not shown) slidable on the periphery of a guide bar 11, is fixed to the outer periphery of the bearing 9 of the clutch drum 7. When the clutch drum 7 is driven, the chain sprocket 24 rotates in unison with the drum 7. Normally, the rotating chain sprocket 24 drives the saw chain so that work, such as cutting trees, can be performed.

A part of the clutch drum 7 is extended axially outward to form an outer end portion 12 opening axially outward. A plurality of (three, in this embodiment) peripheral notches 13 are formed around the outer end portion 12 while the grooves 13 are mutually separated by equal angles.

A work-machine attachment 14, such as a hedge trimmer, a drill, a blower or a mower, has a mounting portion 15 at which the attachment 14 is attached to the portion 4 on the first side of the main body 2 of the power unit 1 by bolts 16 or the like. When such a work-machine attachment is to be used, the saw chain and the guide bar 11 are detached from the main body 2. In the illustrated embodiment, the work-machine attachment 14 is a hedge trimmer.

The attachment 14 includes a drive shaft 17 rotatably supported by bearings 18 and 19. The drive shaft 17 is disposed coaxially with the output shaft 3 of the power unit 1. A dog clutch 20 is secured to one end of the drive shaft 17. The dog clutch 20 has a circular dish-like configuration so that the clutch 20 is able to provide a spring-like action. The outer edge portion of the dog clutch 20 has three clutch claws 21 formed integrally therewith. These clutch claws 21 are mutually separated by equal angles while projecting radially outward, and the number of the clutch claws 21 is the same as the number of the peripheral notches 13 on the outer end portion 12 of the clutch drum 7. The outer edge portion of the dog clutch 20 also has three centering portions 22 formed integrally therewith. These centering portions 22 are mutually separated by equal angles while projecting radially outward and alternating with the clutch claws 21.

When the work-machine attachment 14 is mounted to the portion 4 on the first side of the main body 2 of the power unit 1, as described before, the clutch claws 21 of the dog clutch 20 fit into the individual peripheral notches 13 on the outer end portion 12 of the clutch drum 7 of the centrifugal clutch 5 to engage with these peripheral notches 13. The thus engaging claws 21 provide a spring-like action so as to compensate for any displacement in axial position. This serves to achieve positive transmission of driving force. On the other hand, the centering portions 22 are inserted from the open outer end portion 12 of the clutch drum 7, and are slid on the inner peripheral surface of the outer end portion 12 to be arranged on the inner periphery of the clutch drum 7. The thus arranged portions 22 enables the output shaft 3 and the driving shaft 17 to be mutually aligned.

In the above-described construction, the rotation of the clutch drum 7 is transmitted through the dog clutch 20 to the drive shaft 17 of the work-machine attachment 14, thereby driving the shaft 17 into rotation. The work-machine attachment 14 further includes a gear mechanism 24 which converts the rotation of the drive shaft 17 into reciprocal movement, and then reciprocates trimming blades 23. When the blades 23 reciprocate, it is possible to perform trimming work, such as the work of trimming hedge.

The power unit 1 also allows the attachment thereto of a work-machine attachment, such as a drill, blower or mower, that is not a hedge trimmer, the illustrated example. Such a work-machine can be attached in a similar manner. In such cases, a dog clutch provided in a similar manner on the drive shaft of the attachment is coupled to the clutch drum 7 of the centrifugal clutch 5 of the power unit 1 in the above-described manner, so that the respective work tool of the attachment is driven to perform the desired work.

What is claimed is:

1. A power work-machine comprising:

a power unit having a main body, and an output shaft extending through a portion on a first side of said main body;

a centrifugal clutch provided on one end of said output shaft, said clutch including a clutch drum having an axially extended out end portion;

a plurality of peripheral notches formed on and circumferentially arranged on said outer end portion of said clutch drum;

a work-machine attachment including a mounting portion attached to said portion on said first side of said main body; and a dog clutch provided on a drive shaft of said work-machine attachment, said dog clutch including clutch claws engaging with said peripheral notches of said clutch drum and centering portions projecting radially and circumferentially arranged to slide on the inner peripheral surface of said clutch drum.

* * * * *